United States Patent
Flood et al.

(10) Patent No.: US 6,393,063 B1
(45) Date of Patent: *May 21, 2002

(54) TWO-WAY DIGITAL COMMUNICATION SYSTEM AND METHOD WITHOUT CARRIER LOCK-ON OR INGRESS INTERFERENCE

(76) Inventors: John F. Flood, 800 E. Tropical Way, Plantation, FL (US) 33317; Jacob E. Smitter, 2971 SW. 108th Way, Davie, FL (US) 33328

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/582,586

(22) Filed: Jan. 3, 1996

(51) Int. Cl.[7] .............................. H03D 1/04; H04N 7/16
(52) U.S. Cl. ....................... 375/257; 375/259; 375/348; 725/135
(58) Field of Search ................................. 375/277, 270, 375/301, 321, 272, 346, 257, 222; 455/3.1, 4.1, 4.2, 5.1, 6.2; 348/6, 7, 10, 11, 12, 13; 725/135

(56) References Cited

U.S. PATENT DOCUMENTS

| | | | | |
|---|---|---|---|---|
| 3,278,677 A | * | 10/1966 | Fannoy | 358/86 |
| 3,697,671 A | * | 10/1972 | Parker | 174/115 |
| 4,064,490 A | * | 12/1977 | Nagel | 364/200 |
| 4,225,884 A | * | 9/1980 | Block et al. | 358/122 |
| 4,520,508 A | * | 5/1985 | Reichert, Jr. | 455/4 |
| 4,536,791 A | * | 8/1985 | Campbell et al. | 358/122 |
| 5,550,578 A | * | 8/1996 | Hoarty et al. | 348/7 |

* cited by examiner

Primary Examiner—William Luther
(74) Attorney, Agent, or Firm—Malin, Haley & DiMaggio, P.A.

(57) ABSTRACT

A communication system that provides two-way digital communication between a central site and a plurality of user terminals via standard cable television networks and facilities free from interference from "carrier lock-on" and "ingress" by transmitting an FSK signal over one frequency channel from the central site to the user sites and transmitting two spaced FSK subcarrier signals, on two other frequency channels, from the user terminals to the central site, and where the receiver at the central site has two channels matched in frequency to the subcarrier frequencies and having a decoder that will not pass received information unless it has been received for a prescribed duration at a prescribed level.

19 Claims, 4 Drawing Sheets

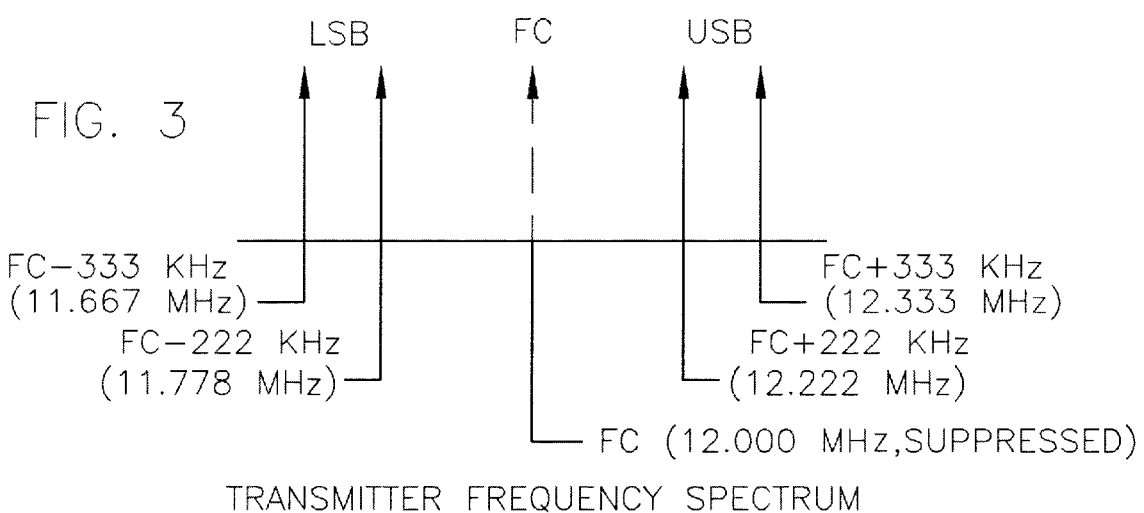
TRANSMITTER FREQUENCY SPECTRUM
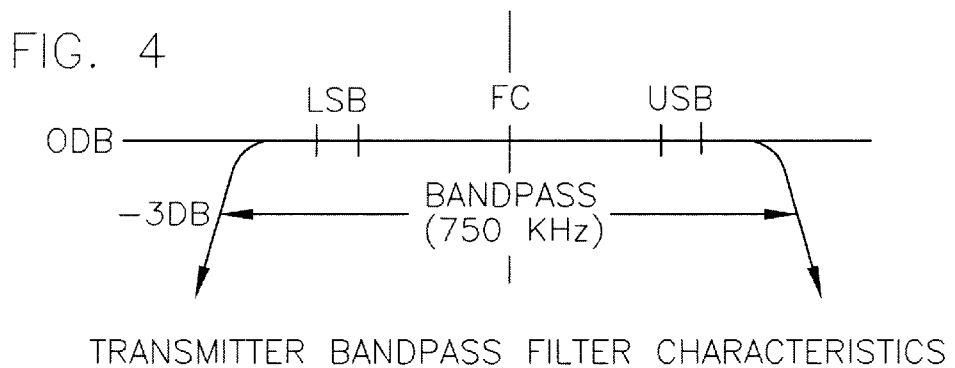
TRANSMITTER BANDPASS FILTER CHARACTERISTICS
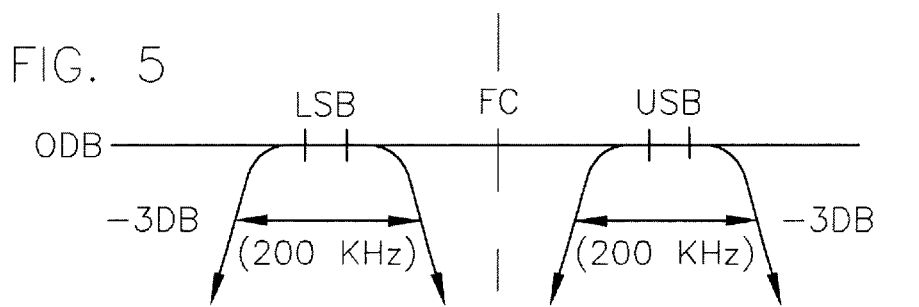
LSB, USB RECEIVERS BANDPASS CHARACTERISTICS

TWO-WAY DIGITAL COMMUNICATION SYSTEM AND METHOD WITHOUT CARRIER LOCK-ON OR INGRESS INTERFERENCE

BACKGROUND OF THE INVENTION

1. Field of the Invention

This invention relates generally to a communication apparatus, and more particularly to a digital communication apparatus that provides digital communication between a plurality of terminal units and a central site using standard cable television coaxial/fiber optic networks and plant facilities.

2. Background Information

Systems for providing digital communications from multiple user terminals to a central site are well known. Previous system implementations, which share common communication channels, suffer substantial reliability degradation in two main areas.

First, when one of the multiple terminals fails such that the terminal continuously transmits, communication from all the other terminals using that communication channel are effectively blocked. This type of system failure is known in the trade as "carrier lock-on".

Secondly, systems which share a communication channel between a large number of customer terminals and a central site are subject to interference from radio broadcast stations and other radio frequency interference. Radio broadcast stations, and certain other interferers, transmit their signals at high power levels and over large geographic areas. Those broadcast signals may be picked up by customer terminals and the attached cable network. The interference pickup from many customer terminals is carried by the common communication channel to the central site. The interfering signals may then sum to a large interfering signal which can degrade or block the communication channel. This type of system interference or blockage is known in the trade as "interference ingress" or simply as "ingress".

Systems incorporating prior art have not been commercially viable because of poor reliability due to "carrier lock-on" and "ingress".

SUMMARY OF THE INVENTION

The present invention provides digital communication between a large number of user terminals and a central site, over a standard cable television coaxial or fiber optic network, without the poor reliability of prior art systems. The advantages of such a system are apparent. Cable television companies want to use their existing networks to provide customers with additional services which require reliable digital communication from the customer's site to a central location over one or more frequency channels.

The present invention provides two-way communication of digital information between a central site and a plurality of user terminals over standard coaxial or fiber optic cables. The central site receives a user address from a digital I/O control and transmits a conventional frequency shift keyed (FSK) signal to all of the user terminals. The user terminal with the correct preassigned address will respond to the signal from the central site and perform its programmed function. The user terminal then transmits an acknowledgment, or a digital message, back to the central site.

The return transmission is a dual FSK signal with suppressed carrier. The full message content is contained in each of the transmitted sidebands. The sidebands are separated sufficiently to prevent a narrow-band interfering signal from degrading or blocking both sidebands simultaneously.

The central site has a receiver with two frequency channels matching the subcarrier's frequencies. The central site receiving apparatus includes a decoder that does not pass information received in the two frequency channels unless it is received at a certain level for a prescribed duration.

A continuous interfering carrier on either sideband and/or momentary interference on either or both sidebands cannot degrade or block data communications on the return signal. Therefore, carrier lock-on and ingress interference do not disrupt digital communication in the present invention.

Accordingly, it is an objective of the present invention to provide a two-way digital communication apparatus which permits reliable communication between many customer terminals and a central site on a common frequency channel over a standard coaxial or fiber optic cable.

A further objective of the present invention is to provide digital communication apparatus which prevents system degradation or blockage due to "carrier lock-on".

A still further objective of the present invention is to provide digital communication apparatus which prevents system degradation or blockage due to narrow-band interference ingress from radio broadcast stations and certain other narrow band interferers.

Yet another objective of the present invention is to provide digital communication apparatus which prevents system degradation or blockage due to wide-band impulse interference ingress.

An even further objective of the present invention is to provide digital communication apparatus which is immune to carrier lock-on and ingress, and is simple and economical in construction.

In accordance with these and other objects which will become apparent hereinafter, the instant invention will now be described with particular reference to the accompanying drawings.

BRIEF DESCRIPTION OF THE DRAWINGS

FIG. 3 is a graph of the terminal unit transmitter frequency spectrum.

FIG. 4 is a graph of the terminal unit transmitter bandpass filter characteristics.

FIG. 5 is a graph of the central communications lower sideband (LSB) and upper sideband (USB) receivers' bandpass characteristics.

DESCRIPTION OF THE PREFERRED EMBODIMENTS

Figure 1:
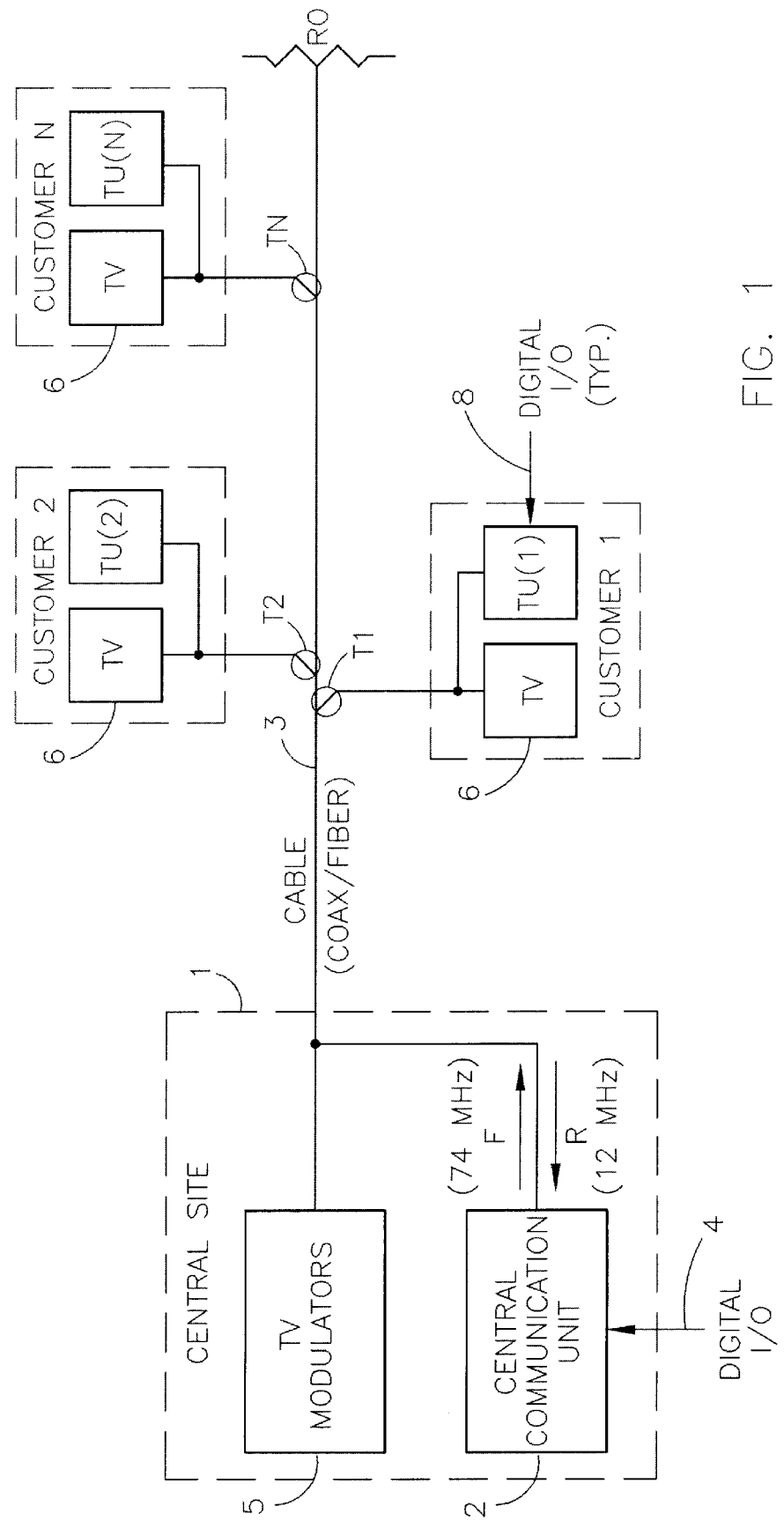
FIG. 1 is a simplified diagram of the communication system.

Referring now to FIG. 1, the communication apparatus of the present invention includes a plurality of terminal units TU(1) through TU(N) and a central communications unit 2 coupled together by cable taps T1 through TN and a coaxial or fiber optic cable 3, which is terminated at RO. The central cite 1 contains the central communication unit 2 and standard TV modulators 5. Each customer site 1–N contains terminal units TU(1)–TU(N) and, optionally, standard televisions (TVs) 6. Terminal units TU(1)–TU(N) can be standalone units or part of a special purpose system such as a premises security monitoring system (not shown). Each terminal unit TU(1)–TU(N) can accept digital input/output (I/O) 8 from a user, shown, for clarity, only at TU(1).

System operation begins when digital I/O 4 presents a terminal unit TU(1)–TU(N) address (polling address) to central communication unit 2. The central communication unit 2 converts the input address to a conventional frequency shift keyed (FSK) signal (at 74 MHz, for example) and transmits the signal on the coaxial, or fiber optic, cable 3 to all user terminal units TU(1) through TU(N). Each terminal unit will accept the address transmitted if and only if the address transmitted matches the reassigned address of the terminal unit. When the terminal unit accepts an address, the terminal unit performs whatever function it was programmed to perform and sends a return message to the central communication unit. The return message may be a simple acknowledgement, or a digital message.

The return transmission is a dual FSK signal with suppressed carrier and has a frequency spectrum (centered at 12 MHz, for example), as shown in FIG. 3. The full message content is contained in each of the bands, the upper sideband (USB) and lower sideband (LSB), transmitted, as shown in FIG. 3. The sidebands are separated sufficiently to prevent a narrow-band signal from degrading or blocking both sidebands simultaneously. The return signal is routed to the coaxial/fiber optic cable 3 to the central communication unit 2.

Cable 3 can be a coaxial cable or fiber optic cable depending on the standard network used for the invention. For simplicity, a coaxial cable is described herein. However, the use of a fiber optic cable and associated optical transmit/receive hardware is equally usable and encompassed by the instant invention.

Figure 2:
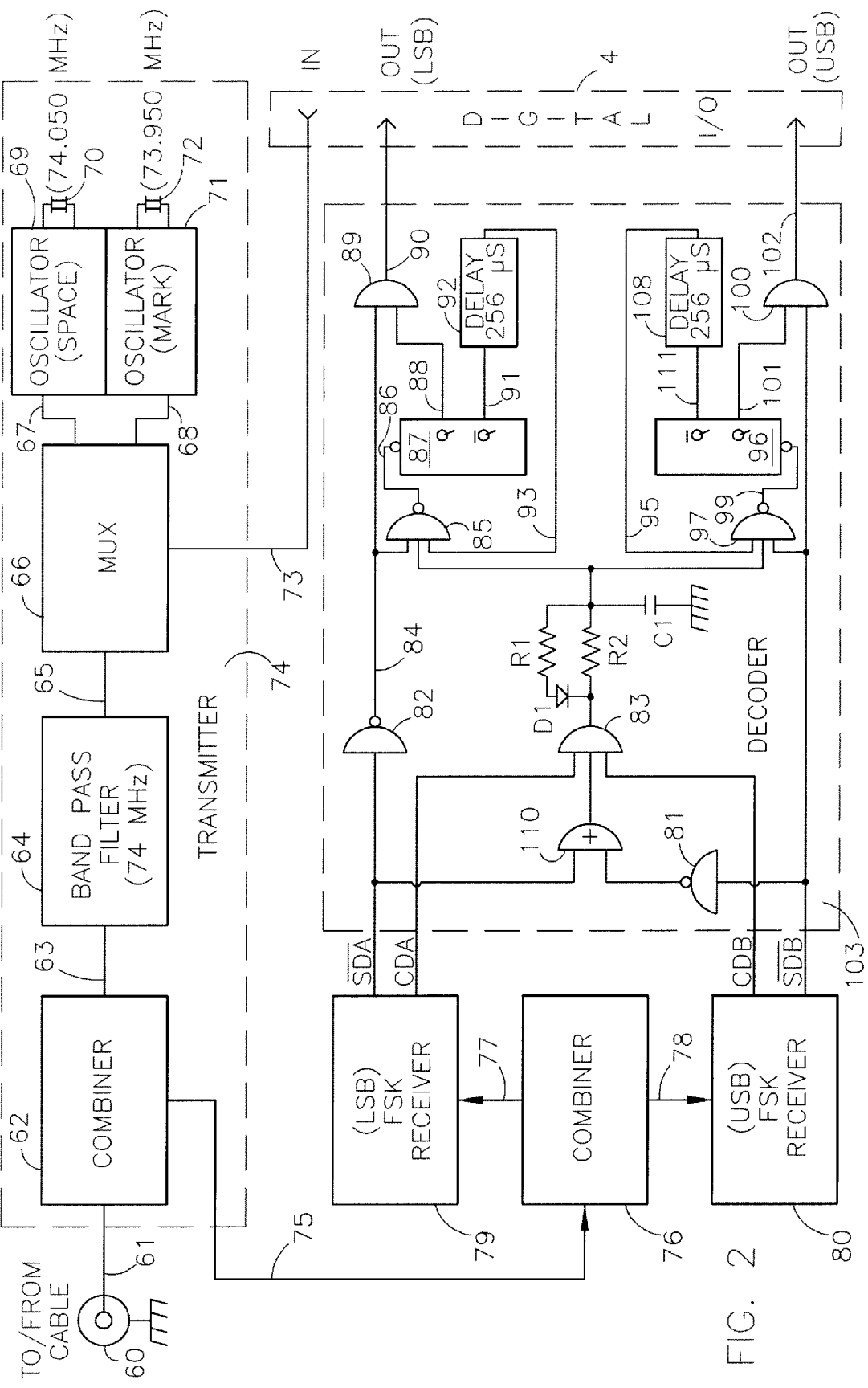
FIG. 2 is a circuit diagram of the central communications unit.

Now referring to FIG. 2, at the central communication unit 2, the return signal from cable 3 is applied through connector 60 and interconnect 61 to combiner 62, to combiner 76 through interconnect 75, and to LSB receiver 79 and USB receiver 80 through interconnects 77 and 78, respectively. Each receiver, 79 and 80, has bandwidth just sufficient to pass signals of one sideband and to reject all other out of band signals as shown in FIG. 5.

The receivers, 79 and 80, are connected to a data decoder 103. The data decoder 103 is configured to output data, 90, 102, only after both receivers', 79, 80, level detector outputs 105, 106, and at least one of serial data signals, 104 and 107, are all present and stable for a time greater than the time constant: R2 X C1 seconds, as determined by resistor R2 and capacitor C1.

Signal data from LSB receiver 79 travels via interconnect 104 to OR gate 110; and through inverter 82, via interconnect 84 to NAND gate 85; and through AND gate 89 to I/O 4 through interconnect 90.

Signal data from USB receiver 80 travels via interconnect 107 through AND gate 100 to I/O 4 via interconnect 102; and through inverter 81 to OR gate 110; and to NAND gate 97.

Receiver level detector outputs travel via 105 and 106 to AND gate 83, where they are passed, along with the output of OR gate 110, through the time constant network of D1, R1, R2, and C1, via interconnect 91, to NAND gates 85 and 97.

The output of NAND gate 85 travels to the "set" input of FLIP/FLOP 87, via interconnect 86. The Q output of FLIP/FLOP 87 travels via interconnect 88 to AND gate 89. The Q' output of FLIP/FLOP 87 travels via interconnect 91 to delay 92 then via interconnect 93 to the "reset" input of FLIP/FLOP 87 and to AND gate 85.

The output of NAND gate 97 travels to the "set" input of FLIP/FLOP 96, via interconnect 99. The Q output of FLIP/FLOP 96 travels via interconnect 101 to AND gate 100. The Q' output of FLIP/FLOP 96 travels via interconnect 111 to delay 108 then via interconnect 95 to the "reset" input of FLIP/FLOP 96 and to AND gate 97.

In operation, the decoder 103 will not pass data to I/O 4 via 90 and 102 unless receiver level detectors 105 and 106, and, at least one of, serial data signals 104 and 107 are present and stable for a time greater than the time constant defined by R2 X C1 seconds. Data from decoder 103 is supplied to the external digital I/O 4 via two channels 90 and 102. Only valid data is presented on, at least one of, the two outputs 90, 102. The valid output(s) are then checked by conventional parity or other standard error detecting features of the data stream presented at I/O 4.

The complete transmitted message is contained in each sideband. A continuous interfering signal on either sideband and/or momentary wide-band impulse interference on either one or both sidebands cannot degrade or block data communications on the return channels.

In the event that one or more of the terminal units TU(1)–TU(N) fails such that its carrier locks–on, the failed unit will transmit its normally suppressed carrier frequency. The carrier frequency is located midway between the upper and lower sidebands as shown in FIG. 3. Because the undesired carrier is outside the bandpass of the USB 80 and LSB 79 receivers, as shown in FIG. 5, no degradation or blockage of either receiver 79, 80 occurs.

During transmission from the central communication unit 2, the transmitter 74 receives the polling address from I/O 4 to multiplex (MUX) 66 via interconnect 73. MUX 66 also receives oscillator frequencies, via interconnects 67 and 68, from oscillators 69 and 71, which use crystals 70 and 72, respectively. The FSK signal is transmitted from MUX 66 through bandpass filter 64, via interconnect 65, to combiner 62, via interconnect 63, and to connector 60, via interconnect 61. (The carrier frequency of 74 MHz is used by example).

The FSK signal from the central communications unit 2 is transmitted to each customer site 1–N through cable taps T1–TN via cable 3, as shown in FIG. 1.

Figure 6:
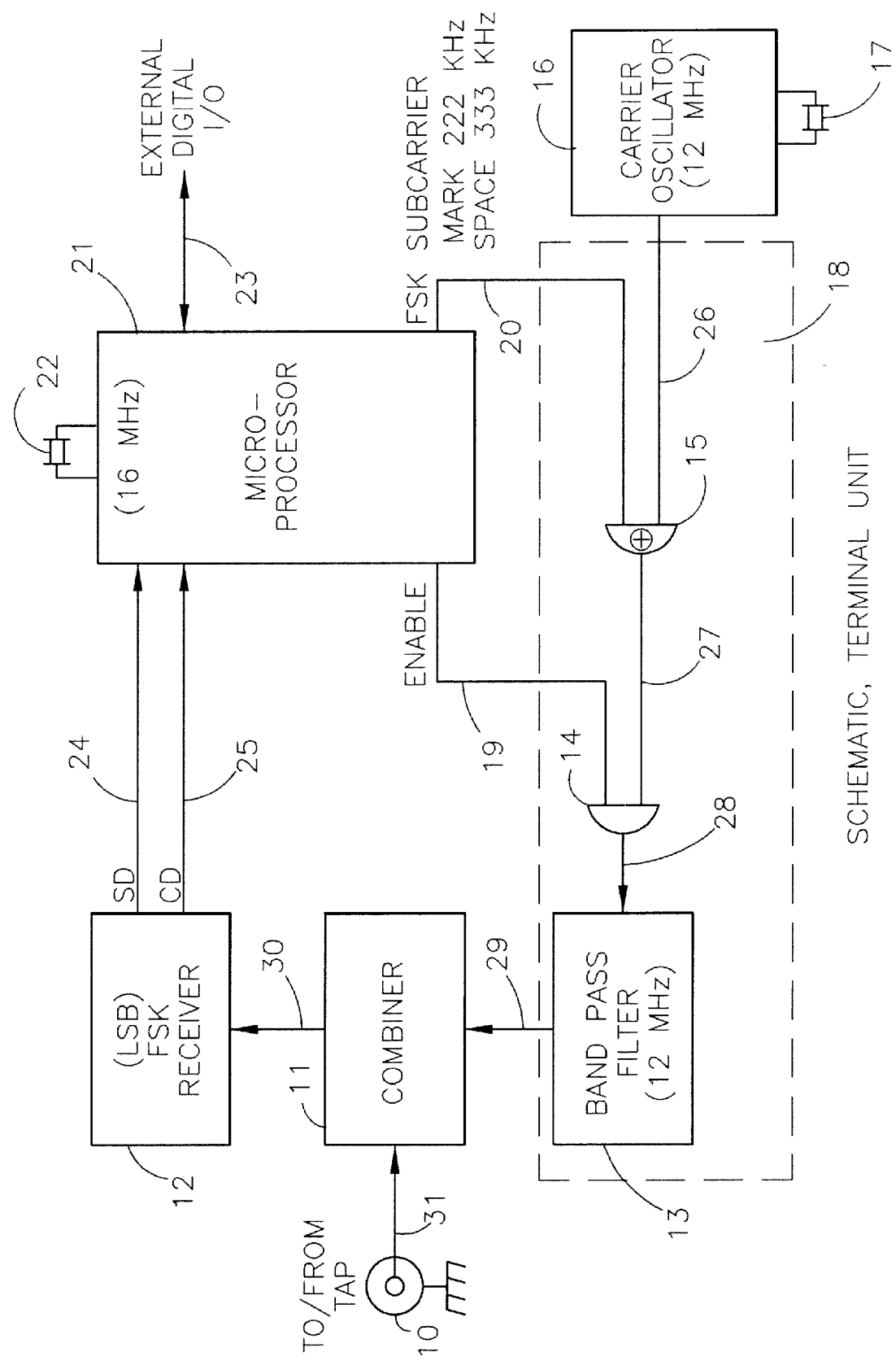
FIG. 6 is a circuit diagram of the terminal unit.

Now referring to FIG. 6, the FSK signal from transmitter 74 is received at combiner 11 from connector 10 via interconnect 31. From combiner 11, the signal passes via interconnect 30 to FSK receiver 12 which is matched to the transmit carrier frequency, (74 MHz, for example). From FSK receiver 12, signal data is sent via 24, and carrier data is sent via 25, to microprocessor 21 for processing. Microprocessor 21 can be any suitable microprocessor, and is shown with a 16 MHz oscillator 22 as an example. Microprocessor transmits and receives user information via 23 to external digital I/O means (not shown).

The signals shown in FIG. 3 are produced by the transmitter 18 portion of each terminal unit TU(1)–TU(N). Microprocessor 21 is programmed to output data as FSK tones. The mark tone being at 222 kHz and the space tone being at 333 kHz, for example. The FSK tones 20 are present only when the microprocessor has data to transmit. Data from users is programmed from external I/O (not shown) via interconnect 23. At all other times, signal 20 is programmed to be a static 1 or 0 logic level.

The FSK subcarrier tones 20 are applied to EXCLUSIVE OR gate 15 along with carrier oscillator signal 26 from carrier oscillator 16, (which uses a 12 MHz crystal 17 as example). EXCLUSIVE OR gate 15 functions as a logic multiplier to produce upper and lower sideband signals, as shown in FIG. 3. The output of the EXCLUSIVE OR gate 15 via interconnect 27, along with the ENABLE signal from microprocessor 21 via interconnect 19, are applied to AND gate 14. When the ENABLE signal on 19 is a logic 1, the output from EXCLUSIVE OR gate 15 is passed to bandpass filter 13 via interconnect 28, otherwise it is blocked by AND gate 14.

Bandpass filter 13 has bandpass characteristics as shown in FIG. 4, and it functions to eliminate harmonics of the desired signal generated by EXCLUSIVE OR gate 15. The transmit signal leaves filter 13 and passes to combiner 11 via interconnect 29. From combiner 11, the signal passes to the network cable 3 via interconnect 31 and connector 10. Once on the network cable 3, the signal proceeds to the central communications unit 2, and the process described herein above repeats.

The decoder circuit of 103 in FIG. 2 is described herein for reception of messages of fixed length as defined by delay circuits 92 and 108. Messages of any length may be processed by making the delays, 92 and 108, programmable.

The forward and reverse channel frequencies are described herein by fixed frequency service using crystal oscillators 16, 69, and 71, FIGS. 2 and 6. Operation at any frequencies may be obtained by making oscillators 16, 69, and 71, and receivers 89, 80, and 12, frequency programmable.

According to the instant invention, a simple economic two-way communication apparatus is provided which prevents system degradation or blockage due to "carrier lock-on" and/or due to "interference ingress".

An example of the use of the present invention can be illustrated using a security monitoring system (not shown). Security monitoring systems typically use a telephone dialer to call a central monitoring site upon activation of sensors at a customers site. During the time the user site is calling the central site, the telephone lines are blocked, preventing the user from making other emergency calls. If the security monitoring system utilized the present invention, and communicated over the cable television's cable network to the central cite, the telephone lines would not be tied-up during a potentially dangerous situations. Furthermore, the communication is two-way allowing the central site to request specific messages or data from the user's site. Polling of user sites can be easily accomplished providing a check on the operation of the system and the interconnecting cable network.

The instant invention has been shown and described herein in what is considered to be the most practical and preferred embodiment. It is recognized, however, that departures may be made therefrom within the scope of the invention and that obvious modifications will occur to a person skilled in the art. Specifically, in the area of digital logic circuits, persons skilled in the art can change logic gates but still perform the same function. Variations such as these are recognized and covered by the scope of this invention.

What is claimed is:

1. A system for two-way digital communication of digital information among multiple users each having a remote communication controller which communicates with a central communication controller over a communications path which permits reliable communication between multiple users' remote terminals and said central controller on a common frequency channel over a standard coaxial cable to prevent system degradation due to carrier lock-on and narrow band radio frequency interference ingress from radio broadcast stations, comprising:

said central communications controller comprising:

means for generating and transmitting a first data signal having a specific, unique user terminal address;

said means for generating and transmitting said first data signal for polling a specific one of said users using a specific, unique user terminal address;

means for receiving a second data signal comprising two frequency-spaced subcarrier redundant data signals; said two frequency-spaced subcarrier redundant data signals being separated sufficiently in frequency to prevent a narrow band signal from degrading or blocking both sidebands simultaneously, said two frequency spaced subcarrier redundant data signals including full, complete message content in each of said frequency spaced subcarrier redundant data signals, said means for receiving a second data signal having a decoder responsive to a preselected duration and level of at least one of said two spaced subcarrier redundant data signals;

digital input/output connected to said means for generating and transmitting a first data signal and connected to the output of said decoder;

means for supplying the output of decoded data to said digital input/output;

said remote communications controllers located remote from said central communications controller comprising and having a specific, unique user terminal address:

means for transmitting said second data signal;

a microprocessor for controlling said means for transmitting;

user digital input/output connected to said microprocessor;

said microprocessor in communication with and responsive to said user digital input/output;

means for receiving said first data signal;

said microprocessor in communication with and responsive to said means for receiving said first data signal; and, coaxial cable interconnecting said central communications controller and said remote communications controllers;

such that said two-way digital communication system prevents system degradation and blockage due to carrier lock-on and narrow band interference ingress from ambient radio frequency transmissions including radio broadcast stations.

2. A system for communication as in claim 1 wherein;

said decoder passes digital information received from at least one of said two subcarrier redundant data signals by said means for receiving if and only if said decoder receives a preselected logic level for a preselected duration;

said preselected duration determined by a time constant of a resistor and a capacitor.

3. A system for communication as in claim 1 wherein;

said means for transmitting said second data signal includes means for generating and transmitting a double sideband FSK subcarrier data signal with main carrier suppressed.

4. A system for communication as in claim 1 wherein; said first data signal is an FSK signal.

5. A system for communication as in claim 3 wherein; said double sideband FSK subcarrier data signal with main carrier suppressed is generated by said microprocessor.

6. A system for communication as in claim 5 wherein; said double sideband FSK subcarrier data signal with main carrier suppressed is transmitted by said microprocessor and a modulator consisting of an EXCLUSIVE OR gate.

7. A system for communication as in claim 1 wherein; said means for interconnecting is a coaxial cable.

8. A system for communication as in claim 1 wherein; said means for interconnecting is a fiber optic cable.

9. A system for communication as in claim 1 wherein; said means for interconnecting is a hybrid fiber optic and coaxial cable.

10. A system for two-way digital communication of digital information among several individual users each having a remote communication controller which communicates with a central communication controller over a communications cable which prevents carrier lock-on between a single remote communication controller and said central communication controller and ambient radio frequency interference of said digital information between a remote communication controller and said central communication controller caused by ambient radio frequency transmission of radio stations or similar signals, comprising:

said central communications controller comprising:
    means for generating and transmitting a first data signal including a specific user address;
    said means for generating and transmitting in communication with and responsive to one of said users having said specific user address;
    means for receiving a second data signal, said second data signal including means for receiving upper and lower sideband redundant frequency spaced subcarrier data signals, each upper and lower sideband signal containing the complete message, said upper and lower sideband frequency spaced apart sufficiently to prevent carrier lock-on from a continuous interference carrier on either sideband and momentary radio frequency interference from ambient radio frequency energy;
    means for receiving said second data signal having a decoder responsive to a preselected duration and level of at least one of said redundant data signals;
    input/output connected to said means for generating and said decoder;
said several remote communications controllers located remote from said central communications controller, comprising;
    means for transmitting said second data signal;
    a microprocessor;
    user input/output connected to said microprocessor;
    said means for transmitting said second data signal in communication with and responsive to said microprocessor;
    said microprocessor in communication with and responsive to said user input/output;
    said at least one remote communications controller having means for receiving said first data signal;
    said microprocessor in communication with and responsive to said means for receiving said first data signal; and,
    coaxial cable interconnecting said central communications controller and said at least one remote communications controller.

11. A system for communication as in claim 10 wherein; said first data signal is an FSK signal.

12. A system for communication as in claim 10 wherein; said second data signal is a double sideband FSK subcarrier data signal with main carrier suppressed.

13. A system for communication as in claim 12 wherein; said decoder passes information received from said redundant frequency spaced subcarrier data signals if said decoder receives a preselected logic level for a preselected duration of at least one of said subcarrier data signals.

14. A system for communication as in claim 12 wherein; said double sideband FSK data signal with main carrier suppressed is generated by said microprocessor.

15. A system for communication as in claim 14 wherein; said FSK signal is transmitted by said microprocessor and an EXCLUSIVE OR gate modulator.

16. A system for communication as in claim 10 wherein; said means for interconnecting is a coaxial cable.

17. A system for communication as in claim 10 wherein; said means for interconnecting is a fiber optic cable.

18. A system for communication as in claim 10 wherein; said means for interconnecting is a hybrid fiber optic and coaxial cable.

19. A method of two way digital communication between at least one remote communication controller and a central communication controller without carrier lock-on and RF ingress interference, comprising the steps of:

at a first location:
a) a central controller connecting at least one remote controller with a coaxial cable;
b) generating a first data signal having a unique user address at a specific remote controller for polling said remote controller;
c) transmitting said first data signal to a second location remote from the first location;
d) receiving a second data signal comprised of two redundant frequency spaced subcarrier data signals having sideband frequency separation to prevent carrier lock-on and RF ambient momentary interference each sideband having the same message in response to said first data signal;
e) decoding at least one of said two redundant frequency spaced subcarrier data signals when said redundant frequency spaced subcarrier data signals correspond to a preselected duration and a preselected level;
f) transmitting said second data signal to a central station output subsequent to said decoding; and, at said second location:
g) receiving said first data signal;
h) communicating said first data signal to said remote controller;
i) generating said second data signal comprised of said two redundant frequency spaced subcarrier data signals in response to the first data signal; and,
j) transmitting said second data signal to the first location.

* * * * *